(12) United States Patent
Ye et al.

(10) Patent No.: US 8,407,589 B2
(45) Date of Patent: Mar. 26, 2013

(54) GROUPING WRITING REGIONS OF DIGITAL INK

(75) Inventors: Ming Ye, Bellevue, WA (US); Herry Sutanto, Redmond, WA (US); Sashi Raghupathy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1072 days.

(21) Appl. No.: 11/788,437

(22) Filed: Apr. 20, 2007

(65) Prior Publication Data

US 2008/0260241 A1    Oct. 23, 2008

(51) Int. Cl.
    *G06F 17/27*    (2006.01)
(52) U.S. Cl. .................... 715/268; 715/262; 715/263
(58) Field of Classification Search .................. 715/262, 715/263, 268
    See application file for complete search history.

(56) References Cited

U.S. PATENT DOCUMENTS

| | | | |
|---|---|---|---|
| 5,517,578 A | 5/1996 | Altman et al. | |
| 5,596,350 A | 1/1997 | Capps et al. | |
| 5,796,866 A | 8/1998 | Sakurai et al. | |
| 5,953,735 A * | 9/1999 | Forcier | 715/273 |
| 6,108,444 A | 8/2000 | Syeda-Mahmood | |
| 6,279,014 B1 * | 8/2001 | Schilit et al. | 715/234 |
| 6,408,092 B1 | 6/2002 | Sites | |
| 6,459,442 B1 | 10/2002 | Edwards et al. | |
| 6,603,881 B2 | 8/2003 | Perrone et al. | |
| 6,859,909 B1 * | 2/2005 | Lerner et al. | 715/203 |
| 7,010,165 B2 | 3/2006 | Hullender et al. | |
| 7,050,632 B2 | 5/2006 | Shilman et al. | |
| 7,062,090 B2 | 6/2006 | Simmons et al. | |
| 2002/0188636 A1 * | 12/2002 | Peck et al. | 707/530 |
| 2003/0215139 A1 * | 11/2003 | Shilman et al. | 382/186 |
| 2004/0098671 A1 * | 5/2004 | Graham et al. | 715/527 |
| 2004/0143796 A1 * | 7/2004 | Lerner et al. | 715/538 |
| 2004/0172595 A1 * | 9/2004 | Lerner et al. | 715/512 |
| 2004/0210833 A1 * | 10/2004 | Lerner et al. | 715/512 |
| 2006/0098871 A1 * | 5/2006 | Szummer | 382/173 |
| 2006/0271580 A1 | 11/2006 | Ye et al. | |
| 2008/0104020 A1 * | 5/2008 | Kato | 707/3 |
| 2008/0235211 A1 * | 9/2008 | Saund | 707/5 |

OTHER PUBLICATIONS

Ao, et al., "Structuralizing Digital Ink for Efficient Selection", Date: 2006, pp. 148-154, ACM Press, New York, USA, http://delivery.acm.org/10.1145/1120000/1111484/p148-ao.pdf?key1=1111484&key2=7323287611&coll=GUIDE&dl=GUIDE&CFID=10435280&CFTOKEN=66737744.

"On-Line Handwritten Documents Segmentation", J. Blanchard and T. Artieres, IEEE Computer Society, Proceedings of the 9th International Workshop on Frontiers in Handwriting Recognition (IWFHR-9 2004), 2004, 6 pgs.

"Recognition and Grouping of Handwritten Text in Diagrams and Equations", Michael Shilman, Paul Viola and Kumar Chellapilla, IEEE Computer Society, Proceedings of the 9th International Workshop on Frontiers in Handwriting Recognition (IWFHR-9 2004), 2004, 6 pgs.

* cited by examiner

*Primary Examiner* — Doug Hutton, Jr.
*Assistant Examiner* — Andrew Dyer
(74) *Attorney, Agent, or Firm* — Microsoft Corporation

(57) ABSTRACT

A method for grouping writing regions of digital ink receives processed digital ink that comprises writing regions. A relationship can be generated between a plurality of the writing regions. A feature set can be determined that is associated with the plurality of the writing regions. The plurality of the writing regions can be grouped based on the feature set.

20 Claims, 15 Drawing Sheets

GROUPING WRITING REGIONS OF DIGITAL INK

BACKGROUND

Computers are regularly being used for a variety of purposes throughout the world. As computers have become commonplace, computer manufacturers have continuously sought to make them more accessible and user-friendly. One such effort has been the development of natural input methods, such as submitting data through handwriting. By writing with a stylus or another object onto a digitizer to produce "electronic ink" or "digital ink," a computer user can forego the bulk and inconvenience associated with a keyboard. Handwriting input conveniently may be used, for example, by doctors making rounds, architects on a building site, couriers delivering packages, warehouse workers walking around a warehouse, and in any situation when the use of a keyboard would be awkward or inconvenient. The use of handwriting input is particularly useful when the use of a keyboard and mouse would be inconvenient or inappropriate, such as when the writer is moving, in a quite meeting, or the like. The use of handwriting input also is the natural choice for creating some types of data, such as mathematical formulas, charts, drawings, and annotations.

While handwriting input is more convenient than keyboard input in many situations, text written in electronic ink typically cannot be directly manipulated by most software applications. Instead, text written in electronic ink must be analyzed to convert it into another form, such as ASCII characters. This analysis includes a handwriting recognition process, which recognizes characters based upon various relationships between individual electronic ink strokes making up a word of electronic ink. Handwriting recognition algorithms have improved dramatically in recent years, but their accuracy can be reduced when electronic ink is written at an angle. Likewise, when separate groups of ink strokes cannot be easily distinguished, such as when two words are written closely together, many recognition algorithms cannot accurately recognize electronic ink. Some recognition algorithms also may incorrectly recognize electronic ink as text when, in fact, the electronic ink is intended to be a drawing.

The accuracy of many recognition algorithms can be greatly improved by "parsing" (e.g., by analyzing the layout of and/or "classifying") the electronic ink before using the handwriting recognition algorithm. A classification process typically determines whether an electronic or digital ink stroke is part of a drawing (that is, a drawing ink stroke) or part of handwritten text (that is, a text ink stroke). Classification algorithms for identifying other stroke types also are possible. The layout analysis process typically groups electronic ink strokes into meaningful associations, such as lines, writing regions, and paragraphs.

It is noted that parsing technologies analyze the structures within handwritten electronic or digital ink to enable advanced editing, searching, conversion and beautification features, thereby combining the best of electronic and paper media. However, there are disadvantages associated with current electronic or digital ink parsing technologies. For example, the current digital ink parsing technologies have limited robustness and extensibility when processing freeform handwritten digital ink notes.

As such, it is desirable to address one or more of the above issues.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A technology for grouping text regions of digital ink is disclosed. For example in one embodiment, a method for grouping writing regions of digital ink receives processed digital ink that comprises writing regions. A relationship can be generated between a plurality of the writing regions. A feature set can be determined that is associated with the plurality of the writing regions. The plurality of the writing regions can be grouped based on the feature set.

Such a method for grouping writing regions of digital ink provides a robust solution for writing region grouping. In this manner, the quality of editing and analysis of digital ink documents can be improved.

DETAILED DESCRIPTION

Reference will now be made in detail to embodiments of the present technology for grouping writing regions of digital ink, examples of which are illustrated in the accompanying drawings. While the technology for grouping writing regions of digital ink will be described in conjunction with various embodiments, it will be understood that they are not intended to limit the present technology for grouping writing regions of digital ink to these embodiments. On the contrary, the presented embodiments of the technology for grouping writing regions of digital ink are intended to cover alternatives, modifications and equivalents, which may be included within the scope the various embodiments as defined by the appended claims. Furthermore, in the following detailed description, numerous specific details are set forth in order to provide a thorough understanding of embodiments of the present technology for grouping writing regions of digital ink. However, embodiments of the present technology for grouping writing regions of digital ink may be practiced without these specific details. In other instances, well known methods, procedures, components, and circuits have not been described in detail as not to unnecessarily obscure aspects of the present embodiments. As may be appreciated from the description herein, the terms "object" and/or "context object" or the like may generally be interpreted mean text, a drawing and/or a graphical unit contained within a document or the like.

Unless specifically stated otherwise as apparent from the following discussions, it is appreciated that throughout the present detailed description, discussions utilizing terms such as "receiving", "generating", "determining", "performing", "grouping", "utilizing", "mapping", "constructing", "producing", "merging", "outputting", or the like, refer to the actions and processes of a computer system (such as computer 100 of FIG. 1), or similar electronic computing device. The computer system or similar electronic computing device can manipulate and transform data represented as physical (electronic) quantities within the computer system's registers and/or memories into other data similarly represented as physical quantities within the computer system memories and/or registers or other such information storage, transmission, or display devices. Some embodiments of the present technology for grouping writing regions of digital ink are also well suited to the use of other computer systems such as, for example, optical and virtual computers.

Example Computer System Environment

Figure 1:
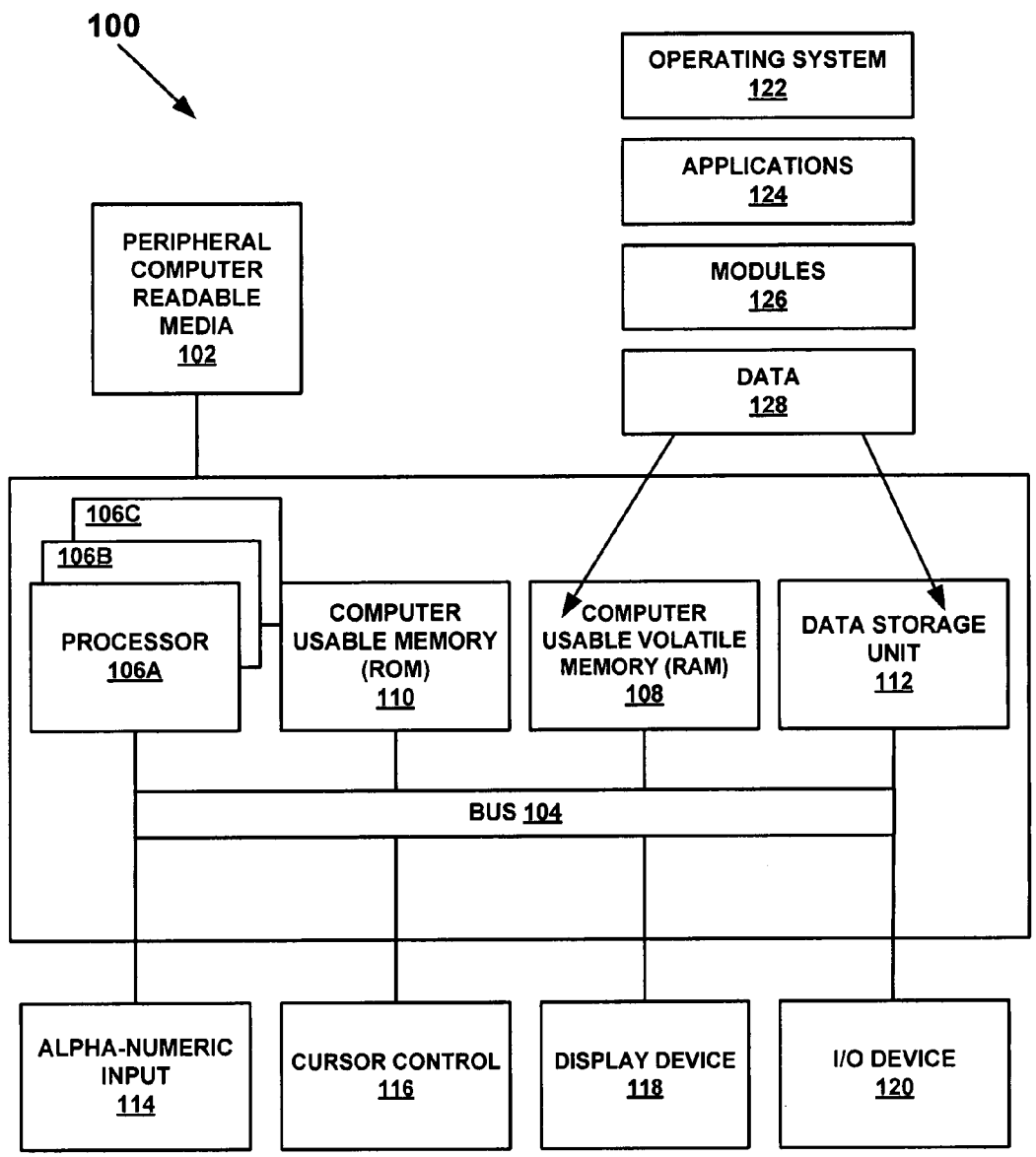
FIG. 1 is a block diagram of an example computer system used in accordance with embodiments of the present technology for grouping writing regions of digital ink.

With reference now to FIG. 1, all or portions of some embodiments of the technology for grouping writing regions of digital ink are composed of computer-readable and computer-executable instructions that reside, for example, in computer-usable media of a computer system. That is, FIG. 1 illustrates one example of a type of computer that can be used to implement embodiments, which are discussed below, of the present technology for grouping writing regions of digital ink. FIG. 1 illustrates an example computer system 100 used in accordance with embodiments of the present technology for grouping writing regions of digital ink. It is appreciated that system 100 of FIG. 1 is only an example and that embodiments of the present technology for grouping writing regions of digital ink can operate on or within a number of different computer systems including general purpose networked computer systems, embedded computer systems, routers, switches, server devices, client devices, various intermediate devices/nodes, stand alone computer systems, media centers, handheld computer systems, low-cost computer systems, high-end computer systems, and the like. As shown in FIG. 1, computer system 100 of FIG. 1 is well adapted to having peripheral computer readable media 102 such as, for example, a floppy disk, a compact disc, a DVD, and the like coupled thereto.

System 100 of FIG. 1 can include an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 can also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 can also include an optional alphanumeric input device 114 including alphanumeric and function keys coupled to bus 104 for communicating information and command selections to processor 106A or processors 106A, 106B, and 106C. System 100 can also include an optional cursor control device 116 coupled to bus 104 for communicating user input information and command selections to processor 106A or processors 106A, 106B, and 106C. System 100 of the present embodiment can also include an optional display device 118 coupled to bus 104 for displaying information.

Referring still to FIG. 1, optional display device 118 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (e.g., cursor) on a display screen of display device 118 and indicate user selections of selectable items displayed on display device 118. Many implementations of cursor control device 116 are known in the art including a trackball, mouse, touch pad, joystick or special keys on alpha-numeric input device 114 capable of signaling movement of a given direction or manner of displacement. Alternatively, it is pointed out that a cursor can be directed and/or activated via input from alphanumeric input device 114 using special keys and key sequence commands. System 100 is also well suited to having a cursor directed by other means such as, for example, voice commands. System 100 can also include an input/output (I/O) device 120 for coupling system 100 with external entities. For example, in one embodiment, I/O device 120 can be a modem for enabling wired and/or wireless communications between system 100 and an external network such as, but not limited to, the Internet.

Referring still to FIG. 1, various other components are depicted for system 100. In embodiments of the present technology, operating system 122 is a modular operating system that is comprised of a foundational base and optional installable features which may be installed in whole or in part, depending upon the capabilities of a particular computer system and desired operation of the computer system. Specifically, when present, all or portions of operating system 122, applications 124, modules 126, and data 128 are shown as typically residing in one or some combination of computer usable volatile memory 108, e.g. random access memory (RAM), and data storage unit 112. However, it is appreciated that in some embodiments, operating system 122 may be stored in other locations such as on a network or on a flash drive (e.g., 102); and that further, operating system 122 may be accessed from a remote location via, for example, a coupling to the internet. In some embodiments, for example, all or part of the present technology for grouping writing regions of digital ink can be stored as an application 124 or module 126 in memory locations within RAM 108, media within data storage unit 112, and/or media of peripheral computer readable media 102. Likewise, in some embodiments, all or part of the present technology for grouping writing regions of digital ink may be stored at a separate location from computer 100 and accessed via, for example, a coupling to one or more networks or the internet.

Overview

Figure 3:
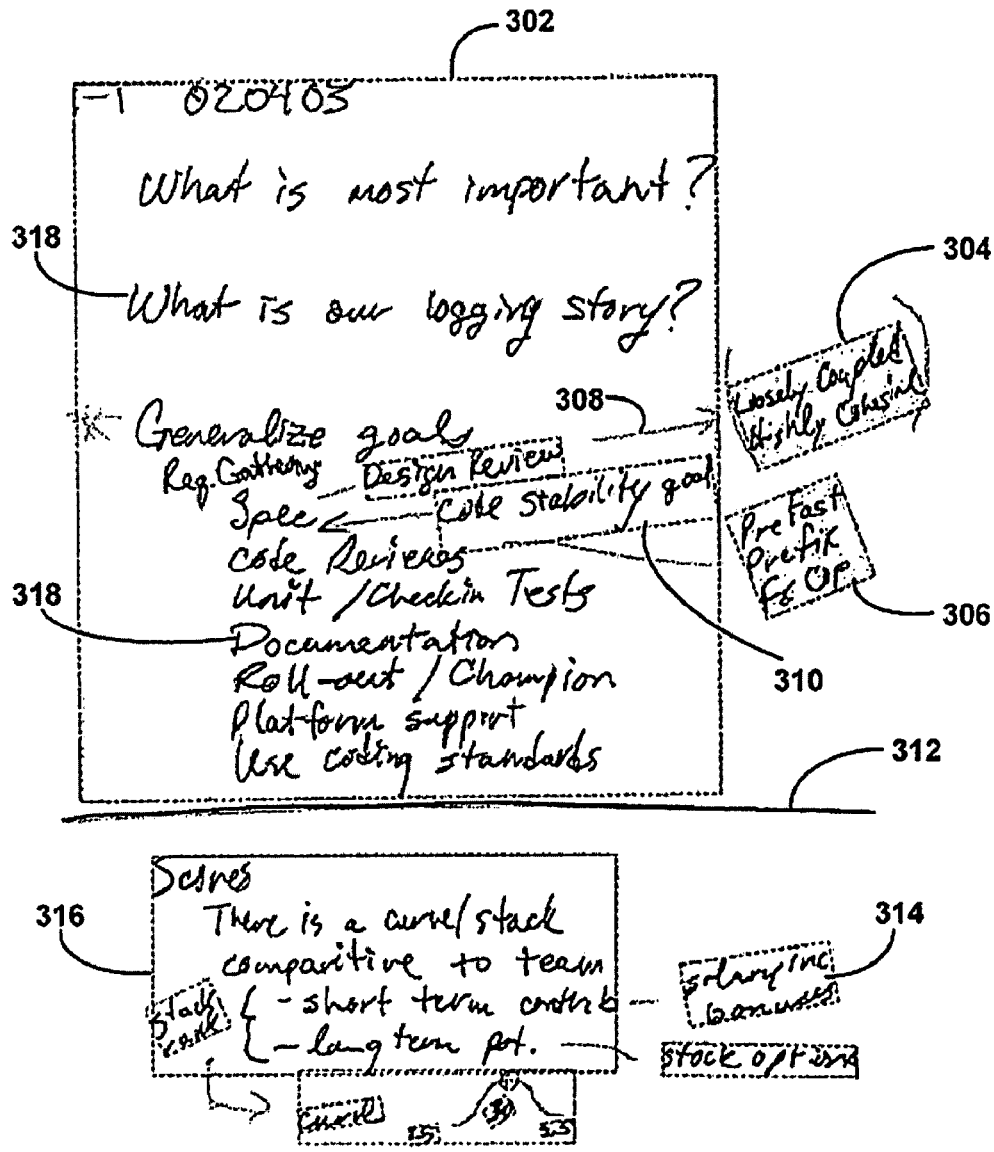
FIG. 3 is a diagram of an example digital ink document that can be utilized in accordance with one embodiment of the present technology.

In one embodiment of the present technology, a learning-based, bottom-up approach can be utilized for grouping to writing regions. Note that in an embodiment, a writing region can be a maximal grouping of adjacent electronic or digital ink handwritten writing lines that have coherent orientation, semantic content and reading order (e.g., top-down) and are not separated by dividers, but is not limited to such. For example, FIG. 3 contains example digital ink writing regions (e.g., 302, 304, 306, 310, 314 and 316) each marked with a dotted box rotated by the writing region's orientation angle. Specifically, FIG. 3 is an example digital ink document or page 300 that can be utilized in accordance with various embodiments of the present technology. The digital ink document 300 can include handwritten digital writing (e.g., 318) and/or handwritten digital drawings (e.g., 308 and 312).

A method or process in accordance with an embodiment of the present technology follows. For example, given an oversegmented digital ink writing page, for every pair of neighboring writing regions, a set of intuitive features can be determined such as a vertical distance between the writing region pair and whether there are other drawing structures lying between them. These features can then be fed to a machine learning-based classifier (e.g., a binary AdaBoost classifier) to produce a merge versus no-merge decision and its associate confidence. A list or queue can be maintained of merge hypotheses sorted by their confidences. The merge hypothesis with the highest or best confidence can be accepted, the list or queue can be updated by removing invalidated merge hypotheses and adding new merge hypothesis, and iterate until the list or queue becomes empty. It is noted that the machine learning-based classifier can be trained on labeled groundtruth data. The method for collecting training examples can be a minor modification of this process.

Note that this learning-based approach in one embodiment is data-driven. As such, adapting it to a different writing region grouping scenario merely involves a retraining and perhaps a few feature adjustments. The method or process in accordance with an embodiment of the present technology can be highly efficient for real-time ink analysis because it can operate in an incremental mode, wherein each parsing call can just update the writing region structures surrounding the locations touched by a user.

Example System for Grouping Writing Regions of Digital Ink

Figure 2:
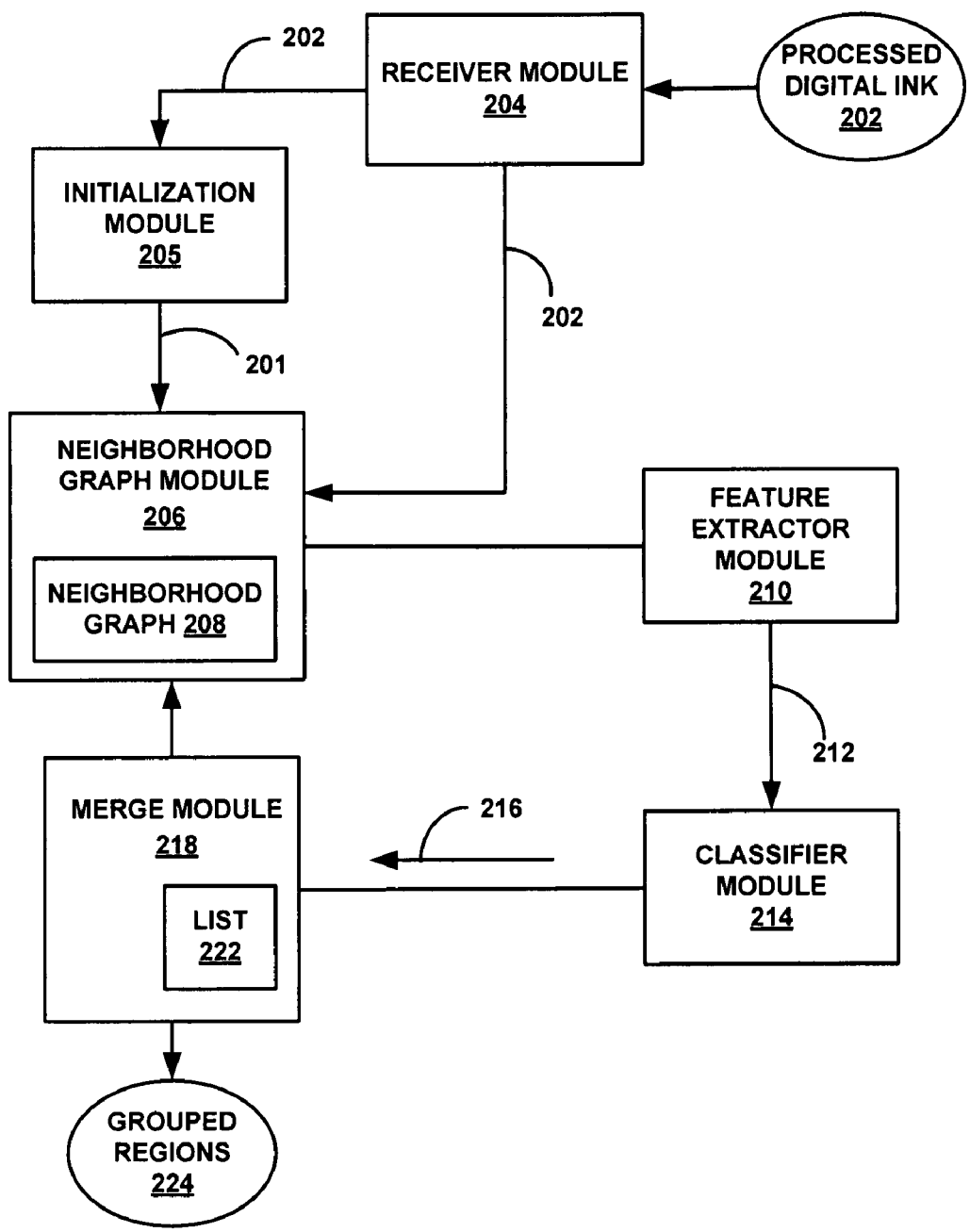
FIG. 2 is a block diagram of an example system for grouping writing regions of digital ink, according to one embodiment of the present technology.

FIG. 2 is a block diagram of an example system 200 for grouping writing regions (or text regions) of digital ink according to one embodiment of the present technology. The grouping system 200 can, in one embodiment, receive processed electronic or digital ink 202 that has been classified into writing (or text) strokes and/or drawing strokes, and the writing strokes have been grouped into text or writing line structures or text lines. The grouping system 200 can group the line structures into writing regions (or text regions). As shown in FIG. 2, the grouping system 200 can include, but is not limited to, a receiver module 204, an initialization module 205, a neighborhood graph module 206, a feature extractor module 210, a ranking module 214, a merge module 218, and a list (or queue) 222.

For purposes clarity of description, functionality of each of the components in FIG. 2 is shown and described separately. However, it is pointed out that in some embodiments, inclusion of a component described herein may not be required. It is also understood that, in some embodiments, functionalities ascribed herein to separate components may be combined into fewer components or distributed among a greater number of components. It is pointed out that in various embodiments, each of the modules of FIG. 2 can be implemented with software, or firmware, or electronic hardware, or electrical hardware, or any combination thereof.

As shown in FIG. 2, the receiver module 204 of the grouping system 200 can be coupled to receive processed electronic or digital ink 202. It is pointed out that the processed digital ink 202 can be received from any type of device that stores, processes, and/or generates digital ink, such as, a processing module or engine, a tablet PC, memory, a handheld portable computing device, and the like. Furthermore, the processed digital ink 202 can be implemented in a wide variety of ways. For example in one embodiment, the processed digital ink 202 has been classified into writing (or text) strokes and/or drawing strokes, and the writing strokes have been grouped into text line structures (or text lines). Moreover in an embodiment, the processed digital ink 202 can originate as a page or document of digital ink or the processed digital ink 202 can include one or more digital ink strokes that originated in real-time. In one embodiment, the processed digital ink 202 can originate as a note page, wherein its layout can frequently be hierarchical. For example, a page could be made up of writing regions, which are made up of lines, words and, at the bottom of the hierarchy, electronic or digital ink strokes. Upon reception of the processed digital ink 202, the receiver module 204 can function as a conduit and transfer or transmit the processed digital ink 202 to the initialization module 205 and the neighborhood graph module 206.

The grouping system 200 can involve in one embodiment a method or process that is learning-based and bottom-up. For example in one embodiment, starting from each digital ink line structure being a region, for each pair of neighboring writing regions, the feature extractor module 210 of the grouping system 200 can compute a set of intuitive features such as the vertical distance between the writing region pair and whether there are other structures lying between them, and feed the features to the ranking module 214 (e.g., a binary AdaBoost classifier) to produce a merge versus no-merge decision and its associate confidence. Note that in one embodiment, the ranking module 214 can operate as a classifier module during a run-time mode, but is not limited to such. The merge module 218 can maintain a list or queue 222 of the merge hypotheses sorted by their confidence values or scores. The merge module 218 can accept the hypothesis with the highest or best confidence value, update the queue or list 222 by removing invalidated hypotheses and adding new hypothesis, and iterate until the list 222 becomes empty. Note that in an embodiment, the merge module 218 can also be referred to a hypothesis handling module 218. For example in an embodiment, the hypothesis handling module 218 can be configured for generating and processing alternative grouping hypotheses. It is pointed out that region pair-wise merge is one hypothesis type. Other hypothesis types can include, but are not limited to, multiple region merge, region split, and the like.

The initialization module 205 can be coupled to the receiver module 204 and as such, can be configured for receiving the processed digital ink 202. The initialization module 205 can be configured to determine how to optimally (e.g., with minimal computation and maximal accuracy) update existing writing region grouping to incorporate any new edits to the digital ink 202. The initialization module 205 can be configured to output or transfer one or more digital ink writing regions 201 to the neighborhood graph module 206. In an embodiment, the initialization module 205 can be configured to make every writing line into a separate writing region when the grouping system 200 is operating in a batch or bottom-up mode. Moreover in an embodiment, when the grouping system 200 is operating in incremental mode (e.g., responding to one or more edits (e.g., add, delete, and/or move) of the digital ink 202), the initialization module 205 can be configured to look at the lines and drawing structures that either one or more users or previous engines have modified and then slice or break writing regions in the vicinity of such "dirty" structures.

The neighborhood graph module 206 can be coupled to the receiver module 204 and as such, can be configured for receiving the processed digital ink 202. Furthermore, the neighborhood graph module 206 can be coupled to the initialization module 205 and as such, can be configured for receiving one or more digital ink writing regions 201. Additionally, the neighborhood graph module 206 can be configured to generate a neighborhood graph 208 utilizing writing lines and context objects of the processed digital ink 202 in combination with the digital ink writing regions 201. In one embodiment, the neighborhood graph 208 can be maintained for two purposes: making sure that merge hypotheses are generated between neighboring regions and for providing context for region pair feature extraction. In one embodiment, the neighborhood graph module 206 can generate the neighborhood graph 208 in real-time.

Within FIG. 2, the feature extractor module 210 can be coupled to the neighborhood graph module 206 and as such, can be configured for utilizing the neighborhood graph 208. For example in one embodiment, the feature extractor module 210 can determine or compute a set of features (or observations) 212 associated with the writing region pair and their context that may lead to the decision of merging them or not. The ranking module 214 can be coupled to the feature extractor module 210 and as such, can be configured for utilizing the set of features (or characteristics) 212. For example in one embodiment, the ranking module 214 can generate a merge hypothesis confidence score 216 for the set of features 212 associated with the pair of writing regions. The merge module 218 can be coupled to the ranking module 214 and as such, can be configured for utilizing merge hypothesis confidence scores 216. For example in one embodiment, the merge module 218 can maintain the merge hypotheses in a list 222 sorted by their confidence scores and upon accepting any hypothesis, updating the list 222 and the neighborhood graph 208 accordingly.

It is pointed out that the neighborhood graph module 206 can have the neighborhood graph 208 evolve as the pair-wise region merging of grouping system 200 progresses. In one embodiment, the feature extractor module 210 can utilize the neighborhood graph 208 at any time to conveniently query for neighbors of any tentative writing region and neighboring context objects (e.g., both writing and drawing content) of any region pair hypothesized to merge. Since the grouping system 200, in one embodiment, just deals with the writing region structures in a note page and leaves other structures intact, the neighborhood graph module 206 can separate the neighborhood graph 208 into a static layer and a dynamic layer.

Figure 4:
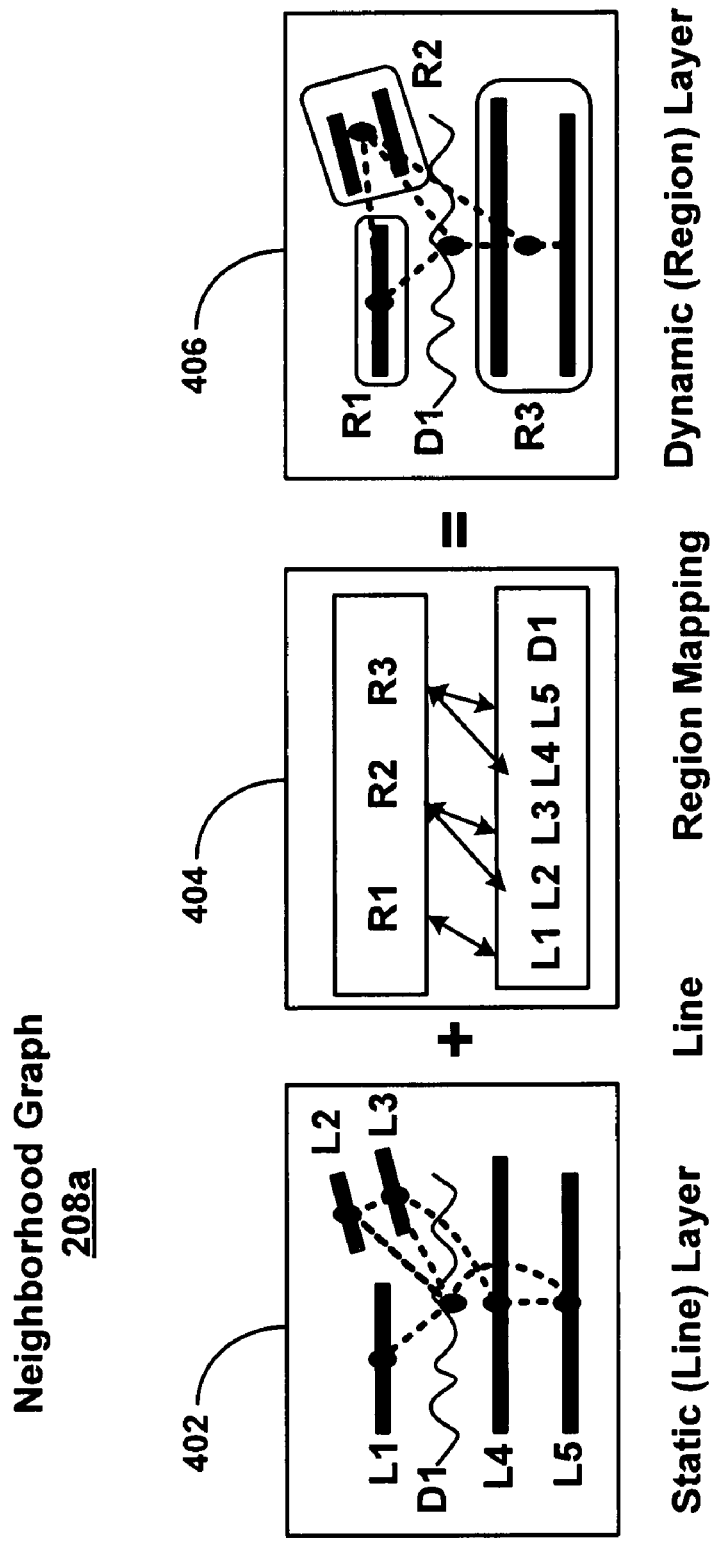
FIG. 4 is a diagram of an example neighborhood graph used for region grouping, in accordance with various embodiments.

For example, FIG. 4 illustrates an example neighborhood graph 208a, in accordance with various embodiments. Specifically, the three components of the neighborhood graph 208a can include a static (line) graph layer 402, a line/region mapping 404, and a dynamic (region) graph layer 406. Specifically, the static layer 402 is a neighborhood graph that can include writing lines (e.g., L1-L5) and context objects (e.g., drawing 1 (D1)). Additionally, the dynamic layer 406 can include the set of tentative writing regions (e.g., R1-R3). A line-region mapping mechanism 404 can maintain the correspondence between lines (e.g., L1-L5) and regions (e.g., R1-R3) and then the neighboring relationship of regions can be derived from the static graph 402 through the mapping 404.

It is noted that the neighborhood graph 208a can be implemented in a wide variety of ways. For example in one embodiment, any neighborhood graphing technology can be utilized to create the static layer 402 of the neighborhood graph 208a.

Within FIG. 2, the feature extractor module 210 can be coupled to the neighborhood graph module 206 in order to utilize the neighborhood graph 208. It is noted that in one embodiment, for every pair of tentative regions that are hypothesized to merge, the feature extractor module 210 can compute a feature set as evidences for a merge versus no-merge decision. That is, the feature extractor module 210 can compute observation features about the tentative writing region pair and their context that may lead to a decision of whether to merge them or not. The feature extractor module 210 can utilize geometric features such as the angle difference, vertical gaps, horizontal overlaps and so on. Furthermore, the feature extractor module 210 can utilize a wide range of spatiotemporal context features.

For example in one embodiment, the feature extractor module 210 can determine or compute three global statistics for normalizing features across different digital ink pages and users. For instance, a first global statistic can be the "Page-FontSize", which is the median of all digital ink stroke fragment lengths in an electronic digital page. A second global statistic can be the "PageWidth", which is the width of the bounding box of all of the digital ink strokes in the electronic page. A third global statistic can be the "MedianInterLineDistance", which is an estimate of line spacing. Specifically in one embodiment, for each line the feature extractor module 210 can compute its vertical distance to its closest neighbor that has sufficient length, similar orientation and horizontal overlap, and is neither too far nor too close, and take the page median as the final estimate.

Additionally, the feature extractor module 210 can determine or compute writing region properties. For example, to prepare for writing region pair feature extraction, the following properties can be computed by the feature extractor module 210 for each hypothetical region. In one embodiment, the feature extractor module 210 can compute the median line angle, which defines the writing region's coordinate system (e.g., angle, orientation). It is noted that in one embodiment, the lines in the writing region are sorted top-down in this coordinate. Furthermore, for each writing region the feature extractor module 210 can cache (or store) their Total-Least-Squares fitting lines and their total lengths. Note that the "slim convex hull" of a writing region is the convex hull of all the fitting lines. In one embodiment, the feature extractor module 210 can sort all lines in a page by their earliest ink strokes' time orders. In this manner, their indices in this sorted array define the lines' time orders. Next, the time span of a writing region is bracketed by the time orders of its top and bottom line structures.

Within FIG. 2, the feature extractor module 210 can determine or compute atomic writing region pair properties. It is noted that an atomic writing region pair property can be combined with other atomic properties or global statistics to compute different writing region pair features. For example, the horizontal overlap between a writing region pair can be scaled by all three of the global statistics to compute three different writing region pair features.

The feature extractor module 210 can determine or compute a wide variety of atomic writing region pair properties. For example, the feature extractor module 210 can determine the "IsSingleSingle" and the "IsSingleMulti". Specifically in one embodiment, given a situation where all other writing region pair features are identical, the merge decision could be different depending on the line counts in the writing region pairs. As such, it can be desirable to be more conservative in merging a single-line writing region and a multi-line writing region than in merging a multi-multi writing region pair, and even more conservative in merging a single-single writing region pair. The feature extractor module 210 can determine these two atomic writing region pair properties.

Figure 5:
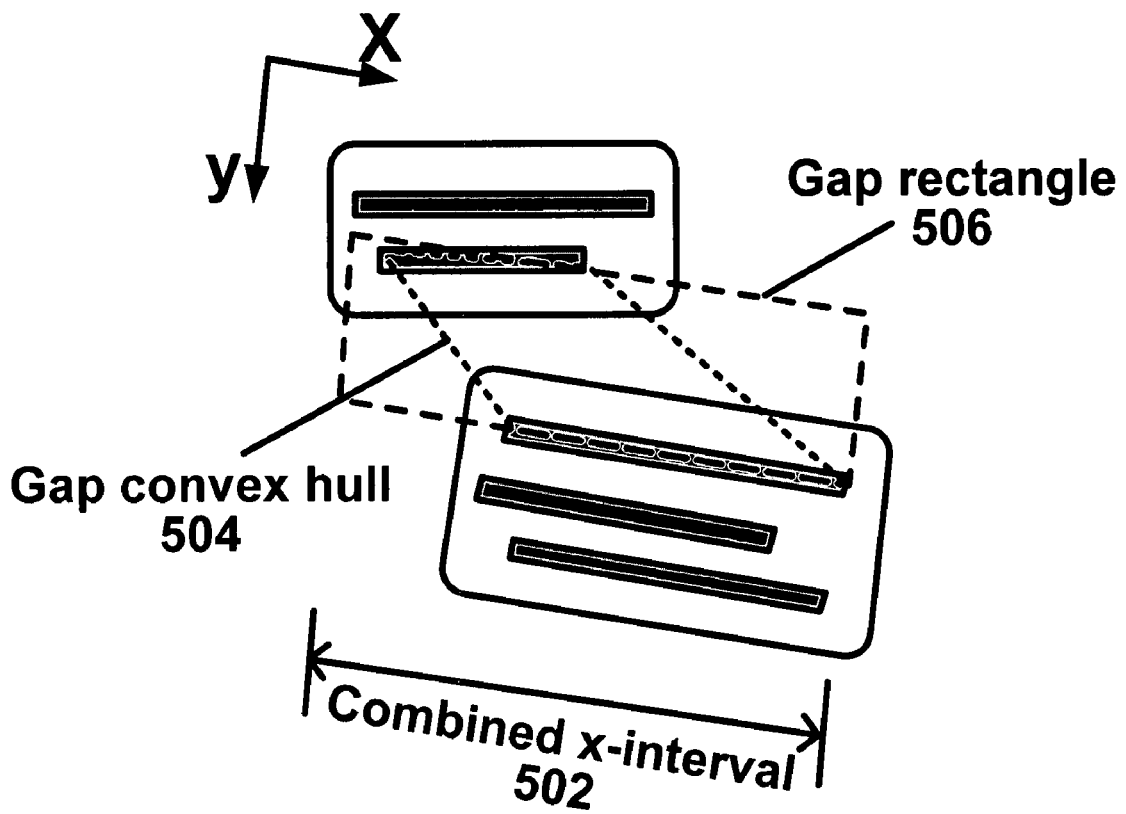
FIG. 5 illustrates a combined X-interval, a gap convex hull, and a gap rectangle of a writing region pair in accordance with various embodiments.

Furthermore, the feature extractor module 210 can determine the "ShortWidth" and the "LongWidth", which are the smaller and larger widths of the writing region pair. The feature extractor module 210 can determine the "CombinedWidth", which can be the width of the writing region pair combined. For example, FIG. 5 illustrates a combined X-interval 502, a gap convex hull 504, and a gap rectangle 506 of a writing region pair in accordance with various embodiments. It is noted that the "ShortWidth", the "LongWidth", and the "CombinedWidth" can be used as normalization factors, e.g. in measuring how wide a drawing divider is within digital ink.

Additionally, the feature extractor module 210 can determine the "LeftIndent" and the "RightIndent", which can be the left and right indentations of the lower region with respect the upper region. The feature extractor module 210 can determine the "AngleDiff" which can be the angle difference between a writing region pair. The feature extractor module 210 can determine the "VerticalOverlapOrGap", which can involve projecting all fitting lines of a writing region to the y-axis, union the projection intervals, and computing the overlap (positive value) or gap (negative value) between the writing region pair's intervals. Moreover the feature extractor module 210 can determine the "VerticallyContains" which can be true if the y projection interval of a writing region contains the other regions. The feature extractor module 210 can determine the "HorizontalOverlapOrGap", which can involve projecting all fitting lines of a writing region to the x-axis, union the projection intervals, and computing the overlap (positive value) or gap (negative value) between the writing region pair's intervals. Furthermore, the feature extractor module 210 can determine the "LinePairHOverlap" which can be the horizontal overlap between the upper region's bottom line and the lower region's top line. Also, the feature extractor module 210 can determine the "UpperLineLength" which can be the length of the upper region's bottom line. The feature extractor module 210 can determine the "AreAdjacentInTime", which can involve sorting the lines in the electronic or digital page by their earliest strokes' time orders. Note that two regions can be adjacent in time if the upper region's last line and the lower region's first line are neighbors in the time-sorted array.

Within FIG. 2, the feature extractor module 210 can determine or compute the "LinesInBetween" properties. The presence of one or more other objects between a writing region pair can provide evidence for the merge decision of a writing region pair. For example, the more number of lines lying in between a tentative writing region pair, the less likely they belong to the same writing region. In one embodiment, "in between" can be mathematically defined with two geometric structures: "gap convex hull" and "gap rectangle", examples of which are shown in FIG. 5. The gap convex hull 504 can be the quadrilateral defined by the fitting lines of the writing region pair's nearest line pair. The gap rectangle 506 can be an upright rectangle in the writing region pair's coordinate (e.g., the larger writing region's coordinate). Note that the gap rectangle 506 is as wide as the CombinedWidth 502. Furthermore, the top and bottom sides of the gap rectangle 506 pass through the centroids of the nearest line pair of the writing region pair. It is pointed out that in one embodiment, a line is in between a writing region pair if its fitting line intersects with the gap rectangle 506. The amount of intersection can be calculated as the x projection interval length. The feature extractor module 210 can determine the "NumLinesInBetween" which is the count of intersecting lines. The feature extractor module 210 can determine the "LengthOflinesInBetween" which can be the total intersection length of all intersecting lines. The feature extractor module 210 can determine the "HasTextLinesInBetween", which can be true if there are typed text lines touching the gap rectangle 506. It is noted that in one embodiment, a third tentative writing region lies in between a writing region pair when any of its lines intersects with the gap rectangle (e.g., 506). The feature extractor module 210 can determine "NumLinesInBlocksInBetween" and the "LengthOfLinesInBlocksInBetween", which can be the total line count and intersection line length of such intersecting writing regions.

Figure 6:
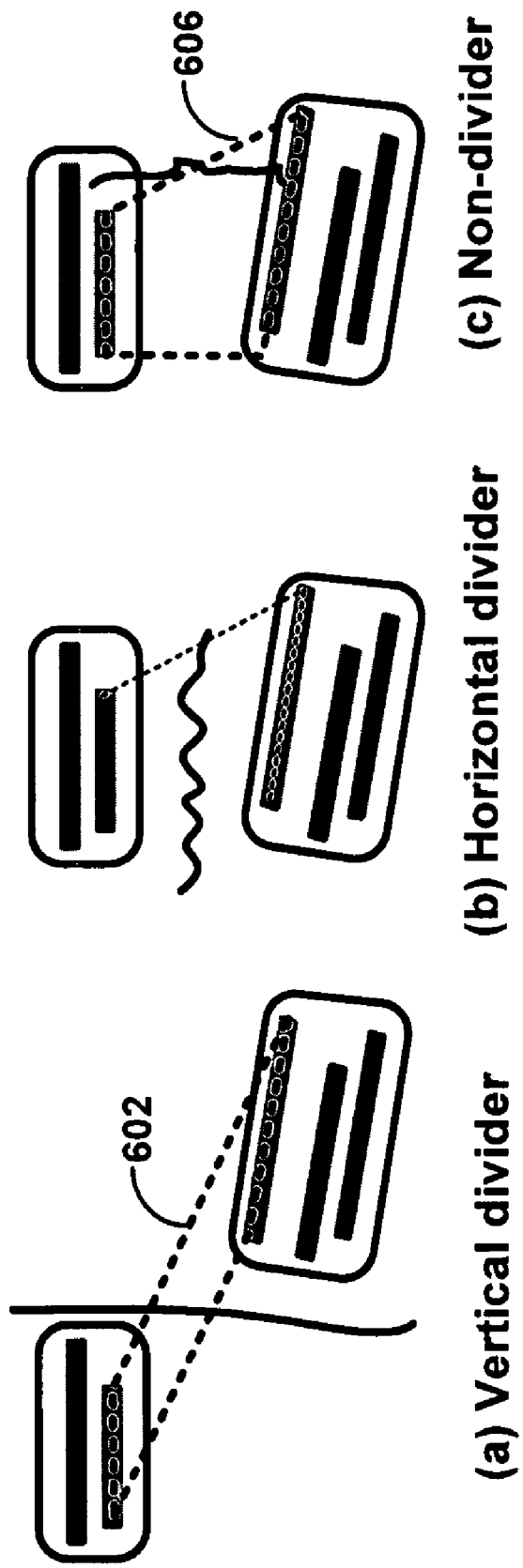
FIGS. 6(a), 6(b), and 6(c) are examples of drawing dividers of digital ink, in accordance with various embodiments.

The feature extractor module 210 can determine or compute drawing divider properties. For example, the feature extractor module 210 can determine that a drawing neighbor of a writing region pair is a divider candidate if its convex hull intersects the gap convex hull (e.g., 504) between the writing region pair. Further tests can be carried out by the feature extractor module 210 to determine whether the drawing is indeed a divider and its type. For example, if the drawing's fitting line is mostly vertical in the writing region pair's coordinate, vertically overlaps with the nearest line pair's centroid 602 and horizontally divides them, the feature extractor module 210 can set the "HasVerticalDividers" to true for this writing region pair, as shown in FIG. 6(a). Note that FIGS. 6(a), 6(b), and 6(c) are examples of drawing dividers of digital ink, in accordance with various embodiments. Furthermore, if a drawing only vertically overlaps with one centroid 606 of the nearest line pair's, it is not a divider as shown in FIG. 6(c), otherwise, it is considered a horizontal divider as shown in FIG. 6(b). The feature extractor module 210 can determine the "NumDrawingsInBetween" which is the total count of horizontal dividers between a writing region pair. For example in one embodiment, the convex hull of a horizontal divider can be intersected with the gap rectangle and take its x projection length in the writing region pair's coordinate as its width. The feature extractor module 210 can determine the "WidthOfDrawingsInBetween" which is the total width of all horizontal dividers.

Within FIG. 2, the feature extractor module 210 can determine container properties, wherein tentative writing regions in the same container can have a higher probability of merging. The feature extractor module 210 can determine the "HaveContainers" is true if the convex hull of a drawing neighbor contains at least one of the two writing regions. The feature extractor module 210 can determine the "HaveSameContainer" is true if the drawing neighbor contains both writing regions.

The feature extractor module 210 can determine or compute region pair features. For example, the following is a list of region pair features. Some features such as "AngleDiff" can be direct copies of the corresponding atomic properties, described above. Some are atomic properties normalized by (indicated by "N" in the name) global statistics or other atomic properties. The feature extractor module 210 can determine or compute region pair features "AreAdjacentInTime", which can involve sorting the lines in the electronic or digital page by their earliest strokes' time orders. Note that two regions can be adjacent in time if the upper region's last line and the lower region's first line are neighbors in the time-sorted array. The feature extractor module 210 can determine or compute region pair feature "AngleDiff", which can be the angle difference between a writing region pair. The feature extractor module 210 can determine region pair feature "CombinedWidthNPageWidth", which can be the width of the combined writing region pair normalized by the "PageWidth", which can be the page width. The feature extractor module 210 can determine region pair feature "CombinedWidthNFontSz", which can be the width of the writing region pair combined normalized by the "FontSz", which can be the font size.

Furthermore, the feature extractor module 210 of FIG. 2 can determine region pair feature "LeftIndentNCombinedWidth", which can be the left indentation normalized by the "CombinedWidth". The feature extractor module 210 can determine region pair feature "RightIndentNCombinedWidth", which can be the right indentation normalized by the "CombinedWidth". The feature extractor module 210 can determine region pair feature "HaveContainers", which can be true if the convex hull of a drawing neighbor contains at least one of the two writing regions. The feature extractor module 210 can determine region pair feature "HaveSameContainer", which can be true if the drawing neighbor contains both writing regions. The feature extractor module 210 can determine region pair feature "IsSingleSinglePair", "IsSingleMultiPair", "IsMultiMultiPair", which in one embodiment, given a situation where all other writing region pair features are identical, the merge decision could be different depending on the line counts in the writing region pairs. As such, it can be desirable to be more conservative in merging a single-line writing region and a multi-line writing region than in merging a multi-multi writing region pair, and even more conservative in merging a single-single writing region pair.

The feature extractor module 210 can also determine region pair feature "HorizontalOverlapNShortWidth", which can involve projecting all fitting lines of a writing region to the x-axis, union the projection intervals, and normalized by the "ShortWidth", which is the smaller width of the writing region pair. The feature extractor module 210 can determine region pair feature "HorizontalOverlapNCombinedWidth", which can be the "HorizontalOverlap" normalized by the "CombinedWidth". The feature extractor module 210 can determine region pair feature "HorizontalOverlapNFontSz", which can be the "HorizontalOverlap" normalized by the "FontSz". The feature extractor module 210 can determine region pair feature "HaveHorizontalGap", which can be true if there is a horizontal gap exists between the writing region pair. The feature extractor module 210 can determine region pair feature "HorizontalGapNCombinedWidth", which can be the determined horizontal gap between the writing region pair normalized by the "CombinedWidth". The feature extractor module 210 can determine region pair feature "HorizontalGapNCombinedWidth", which can be the "HorizontalGap" normalized by the "CombinedWidth".

Within FIG. 2, the feature extractor module 210 can also determine region pair feature "VerticalGapNPageMedian", which can be the determined vertical gap between the writing region pair normalized by the "PageMedian", which can be the median of the page width. The feature extractor module 210 can determine region pair feature "VerticalGapNFontSz", which can be the "VerticalGap" normalized by the "FontSz". The feature extractor module 210 can determine region pair feature "VerticalGapNCombinedWidth", which can be the "VerticalGap" normalized by the "CombinedWidth". The feature extractor module 210 can determine region pair feature "HaveVerticalOverlap", which can involve projecting all fitting lines of a writing region to the y-axis, and union the projection intervals. The feature extractor module 210 can determine region pair feature "VerticalOverlapNPageMedian", which can be the "VerticalOverlap" normalized by the "PageMedium".

The feature extractor module 210 can also determine region pair feature "HaveLinesInBetween", which can be true if there is one or more writing lines located between the writing region pair. The feature extractor module 210 can determine region pair feature "LengthOfLinesInBetweenNCombinedWidth", which can be the length of the longest writing line located between the writing region pair normalized by the "CombinedWidth". The feature extractor module 210 can determine region pair feature "NumLinesInBlocksInBetween", which can be the total line count of intersecting writing regions. The feature extractor module 210 can determine region pair feature "LengthOfLinesInBlocksInBetweenNCombinedWidth", which can be the "LengthOfLinesInBlocksInBetween" normalized by the "CombinedWidth". The feature extractor module 210 can determine region pair feature "HaveDrawingsInBetween", which can be true if there is one or more drawings located between the writing region pair. The feature extractor module 210 can determine region pair feature "WidthOfDrawingsInBetweenNShortWidth", which can be the total width of all horizontal dividers normalized by the "ShortWidth". The feature extractor module 210 can determine region pair feature "WidthOfDrawingsInBetweenNPageWidth", which can be the "WidthOfDrawingsInBetween" normalized by the "PageWidth". The feature extractor module 210 can determine region pair feature "LinePairHOverlapNShortWidth", which can be the horizontal overlap between the upper region's bottom line and the lower region's top line normalized by the "ShortWidth". The feature extractor module 210 can determine region pair feature "DrawingWidthNUpperLineLength", which can be the combined width of any drawings located between the writing region pair normalized by the "UpperLineLength", which can be the length of the upper region's bottom line. It is noted that the above feature set can be a result of iterative training, error analysis, feature tuning and training set adjustment. More features can be added following a similar practice. It is noted that this general approach to spatiotemporal context feature extraction can be applicable to other ink parsing problems as well.

Note that the construction of the feature set by the feature extractor module 210 can be intuition-guided and heuristic. The resulting features may have varying degrees of reliability. However, it is noted that how informative these features are and what combinations of them make more sense can be determined by training data utilized with the ranking module 214.

Within FIG. 2, the ranking module 214 can be coupled to the feature extractor module 210 in order to receive any feature set results 212. The ranking module 214, in one embodiment, can make the merge/no-merge decision and rate the confidence score or value of each merge hypothesis. It is noted that the ranking module 214 can be implemented in a wide variety of ways. For example in one embodiment, the ranking module 214 can utilize one or more machine learning techniques. The one or more machine learning techniques can include, but are not limited to, a binary AdaBoost decision-tree, a decision tree, a neural network, an AdaBoost decision tree, the Hidden Markov Model technique, a support vector machine, a machine learning-based classification technique, or any combination thereof. It is pointed out that when the ranking module 214 is implemented as a binary AdaBoost decision-tree classifier, it can exhibit the following two desirable properties: (1) it can produce real-valued confidences to enable the comparison of competing hypotheses and (2) it can be a discriminative classifier and performs feature selection automatically so that it can receive arbitrary features and sort out how to make use of them.

Within FIG. 2, it is noted that the region grouping system (or engine) 200 can take a bottom-up approach. For example in an embodiment, the initialization module 205 of the grouping system 200 can start by making every line of the processed digital ink 202 into a separate region, which are feed to the neighborhood graph module 206. For each pair of neighboring regions, the feature extractor module 210 can compute a set of features and feed the results 212 to the ranking module 214 to produce a merge/no-merge decision and associated confidence. For example in an embodiment, the ranking module 214 can produce a real-valued confidence score. When the score is positive the decision can be to merge, otherwise the decision can be not to merge. Note that if a hypothesis has a positive score, it can be referred to as a positive hypothesis. If a merge decision is made, the hypothesis 216 can be added to the list or queue 222 maintained by the merge module 218 together with its positive confidence score. The merge module 218 can be implemented as a mechanism for maintaining merge hypotheses in a list sorted by their confidence scores or values. Note that upon accepting any hypotheses, the merge module 218 can update the list 222 and the neighborhood graph 208 accordingly. In one embodiment, the hypothesis with the highest or best confidence score can be accepted by the merge module 218, the neighborhood graph 208 can be updated, invalidated hypotheses can be removed from the list 222, new hypotheses can be added for the newly created region, and iterating until the list 222 becomes empty. Note that the neighborhood graph 208, in one embodiment, has been effective in pruning the number of hypothesis generated to a manageable size.

Figure 7A:
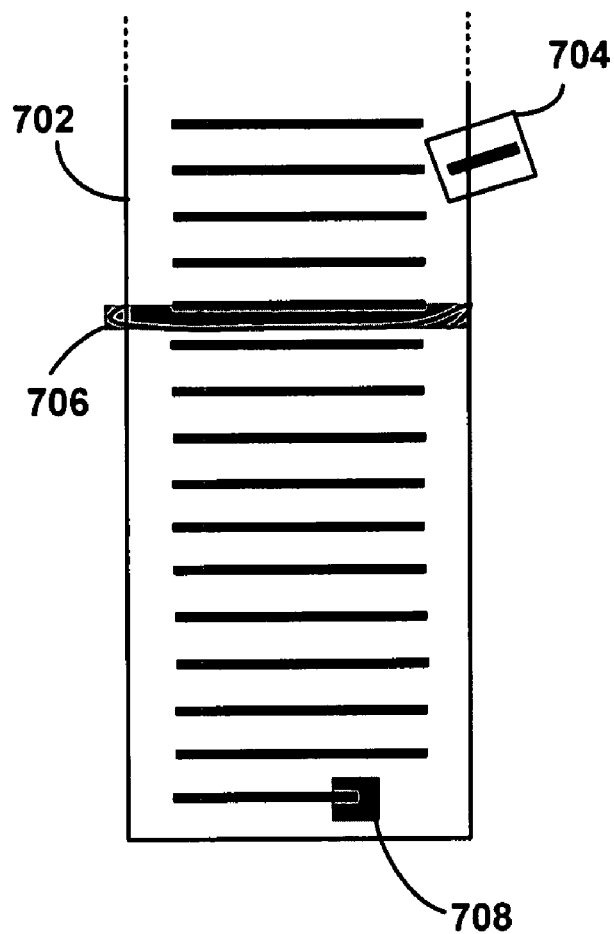
FIGS. 7(a) and 7(b) illustrate incremental edits and region initialization in accordance with various embodiments.
Figure 7B:
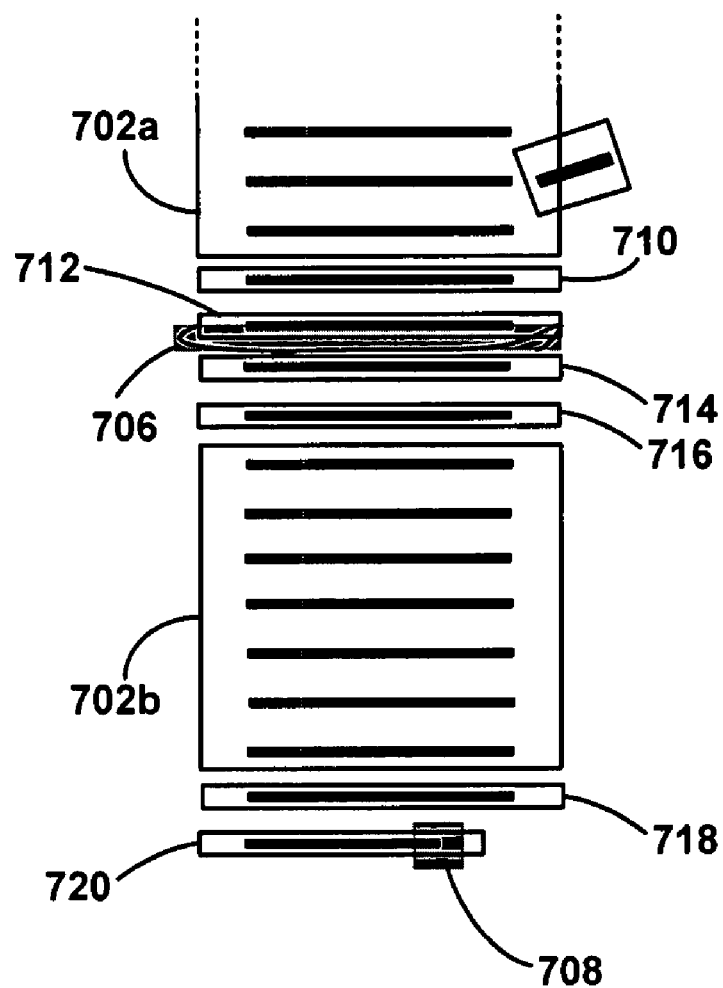

Within FIG. 2, it is noted that in one embodiment the grouping system 200 can be implemented to operate in an incremental mode. For example, for some digital ink target scenarios, parsing can usually happen incrementally. Processing the entire ink document from scratch may not be acceptable since users desire quick results to help with their editing operations or because it is desirable to conserve precious battery power of mobile devices such as Tablet PCs. Hence, parsing engines can be invoked periodically with incremental changes that the user has made to the ink document. The framework of grouping system 200 can extend very well to such incremental scenarios. For example in an embodiment, during each incremental session the initialization module 205 of the grouping system 200 can look at the lines and drawing structures that either users or previous engines have modified and then slice or break regions in the vicinity of such "dirty" structures. FIGS. 7(a) and 7(b) illustrate incremental edits and region initialization in accordance with various embodiments. Specifically, FIG. 7(a) includes a long main writing region 702 and a small annotation region 704 in the page. A drawing divider 706 and several words 708 have been added to the long region 702 since the last parsing call. The dirty regions corresponding to the new edits are shown by gray rectangles 706 and 708. In the incremental mode, the initialization module or stage 205 just makes lines near the dirty regions single-regions (e.g., 710, 712, 714, 716, 718 and 720 as shown in FIG. 7(b). Unlike the initialization stage 205 previously described involving the bottom-up approach and generating a neighborhood graph (e.g., 208), at the start there can be a mix of single-line regions (e.g., 710, 712, 714, 716, 718 and 720) and more complete regions (e.g., 702a and 702b) with multiple lines. As such, processing by grouping system 200 can proceed in a similar fashion as described herein by first setting up the merge hypothesis between the existing block pairs.

It is noted that the main writing region in a digital ink note page can grow quite large. This is especially true if the application does not place hard page breakers and the size of a writing region can grow virtually infinitely. In such scenarios, if the purpose of each incremental parsing call is to "massage" a few new edits into the existing page structures, it is not only a waste but a huge performance burden to copy all digital ink strokes and the complete page structure into the parser each time. A prune-and-clone engine can perform a prune-and-clone process to address this issue. Note that the prune-and-clone engine is not a part of the grouping system 200.

The general idea of prune-and-clone is that the prune-and-clone engine can copy detailed structures just in the vicinity of new edits, leave the rest of page structures as "shadows" (e.g., bounding boxes with internal structures invisible) and in doing so upper-bound the amount of page structures entering the parser.

Figure 8A:
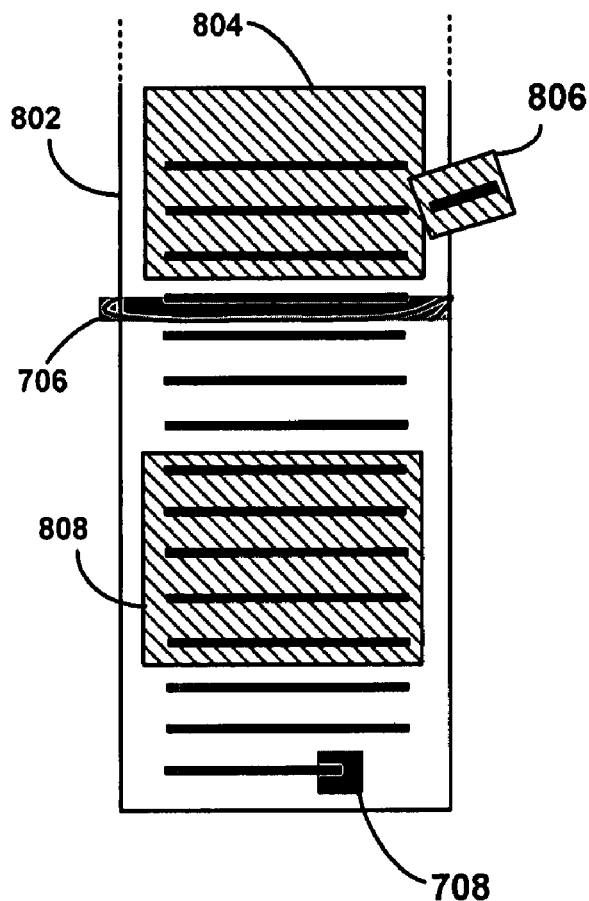
FIGS. 8(a) and 8(b) illustrate a prune-and-clone process in accordance with various embodiments.
Figure 8B:
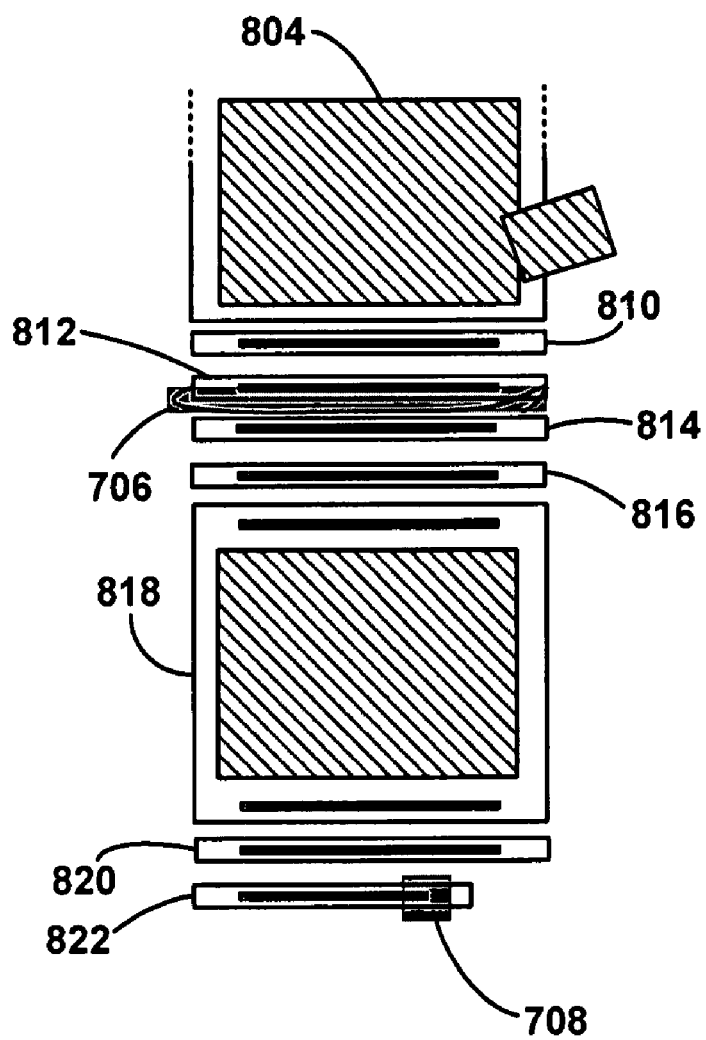

Within FIG. 2, any structures (e.g., writing regions, drawings, etc.) in the digital ink page can become shadows by prune-and-clone engine when they are sufficiently far away from the dirty regions. For each writing region located nearby dirty regions, its paragraphs can be deep-copied by prune-and-clone engine while the rest can be left as shadows. Paragraph structures within each writing region can be fleshed out by another engine (e.g., outline analysis) in the parser pipeline. FIGS. 8(a) and 8(b) illustrate a prune-and-clone process in accordance with various embodiments. Specifically, FIG. 8(a) illustrates that the small annotation writing region 806 and some paragraphs 804 and 808 of the long writing region 802 become shadow (hatched) after a prune-and-clone process is performed by the prune-and-clone engine.

FIG. 8(b) illustrates that the initial regions 810, 812, 814, 816, 818, 820, and 822 after the prune-and-clone engine slices the existing regions near dirty regions 706 and 708. Since the majority of features apply to shadow segments indifferently, tentative regions containing shadow segments could be merged the same way as regions with no shadow. There is at least one caveat though. The "AreAdjacentInTime" feature involves actual ink strokes to be available in tentative regions. If we default it to false for shadow regions, since "AreAdjacentInTime" is a pretty strong feature, a shadow region could be separated out just because this feature is now false. What would happen symptomatically in the note-taking application is that paragraphs start to move out of their writing regions once the dirty regions get far enough away. One measure to reduce the severity of this issue is to cache temporal adjacency relationship to shadow segments before they are sliced out by the prune-and-clone engine. For the top shadow region 804 in FIG. 8(b), the stroke IDs can be cached in the ink line 810 below as its temporal signature. Then when the time comes to calculate "AreAdjacentInTime"

for the shadow region 804 and the ink line 810, the cached signature can be examined as to whether it partially matches the ink line 810's time.

Within FIG. 2, the grouping system 200 can include in one embodiment a learning-based optimization process or method for grouping two structures, text writing regions, in freeform digital ink notes. It is noted that the machine learning approach that can be utilized within the grouping system 200 can make it much more robust and extensible than hand-engineered systems. For example, grouping a new structure type may just involve incorporating one or more new modules for initialization, hypothesis generation and featurization. Furthermore, in one embodiment, the advantage in incrementality makes the framework of the grouping system 200 even more appealing to online applications.

Note that the grouping system 200 can include one or more other modules, which are not shown.

Figure 10:
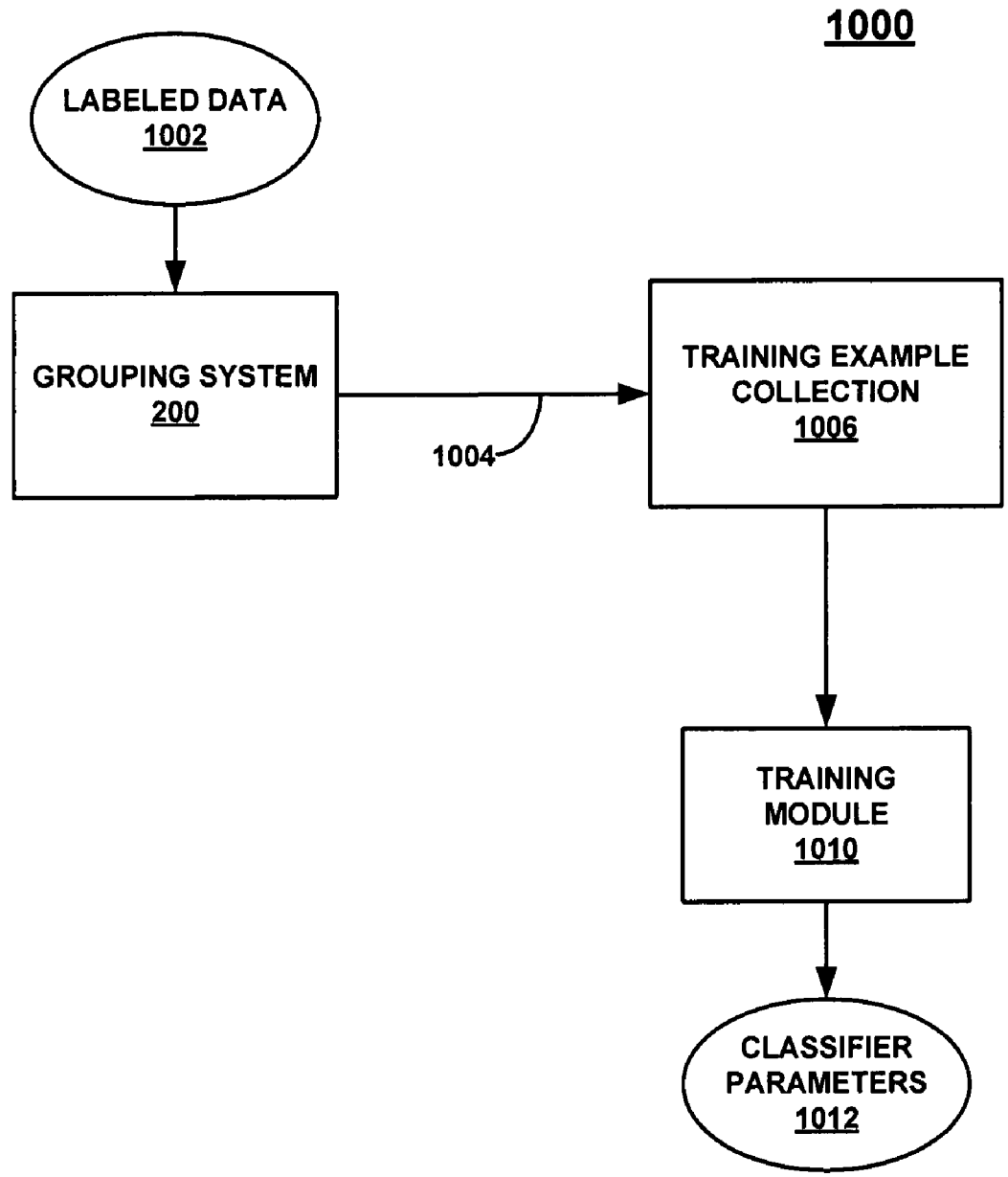
FIG. 10 is a block diagram of an example training system in accordance with various embodiments of the present technology.

FIG. 10 is a block diagram of an example training system 1000 in accordance with various embodiments of the present technology. The training system 1000 can, in one embodiment, fix one or more parameters for a classifier (e.g., ranking module 214 of the grouping system 200) based on labeled data. For example, the ranking module 214 can compute each pair merge score from groundtruth (labeled data) 1002 and saves the hypothesis as a training example 1004. As shown in FIG. 10, the training system 1000 can include, but is not limited to, the grouping system 200, a training example collection 1006, and a training module 1010.

For purposes clarity of description, functionality of each of the components in FIG. 10 is shown and described separately. However, it is pointed out that in some embodiments, inclusion of a component described herein may not be required. It is also understood that, in some embodiments, functionalities ascribed herein to separate components may be combined into fewer components or distributed among a greater number of components. It is pointed out that in various embodiments, each of the modules of FIG. 10 can be implemented with software, or firmware, or electronic hardware, or electrical hardware, or any combination thereof.

As shown in FIG. 10, the grouping system 200 of the training system 1000 can be coupled to receive labeled groundtruth data 1002. As such, the grouping system 200 can collect training examples 1004 from labeled user files 1002, which can be utilized for adapting the ranking module 214 of FIG. 2 when it is operating as a classifier during a run-time mode. During a training mode in an embodiment, training examples can be collected by the training system 1000 by reusing a grouping technique in accordance with the present technology. For example, when system 200 is hypothesizing merging a neighboring region pair, this hypothesis can be recorded as a positive one if the region pair forms a single segment in a labeled writing region, and a negative one otherwise. For every positive example, a random confidence score can be assigned by the ranking module 214 of the grouping system 200 when adding it to the list 222. The collection can proceed until the labeled grouping is achieved. The grouping system 200 can output each training example 1004 to the training example collection 1006, which is coupled to receive each training example 1004. An advantage of this collection method during the training mode is that it can create a compact training example set or collection 1006 that resembles the example distribution during run-time of the grouping system 200. It is noted that the closer the training and testing sets 1006 are, the higher accuracy can be achieved on the testing set.

One or more training example sets 1006 can be output by the training example collection to the training module 1010, which is coupled to receive the one or more sets 1006. The training module 1010 can match the one or more training example sets 1006 in order to produce (or generate) one or more classifier parameters 1012. It is pointed out that in one embodiment, the one or more classifier parameters 1012 that are output by the training module 1010 can subsequently be utilized for programming the functionality of the ranking module 214 of FIG. 2 when it is operating as a classifier module. In this manner, in an embodiment, the classifier module can be trained with examples collected by the training system 1000 in which the ranking module 214 of grouping system 200 can compute scores based on labeled data.

Example Methods of Operation

Figure 11:
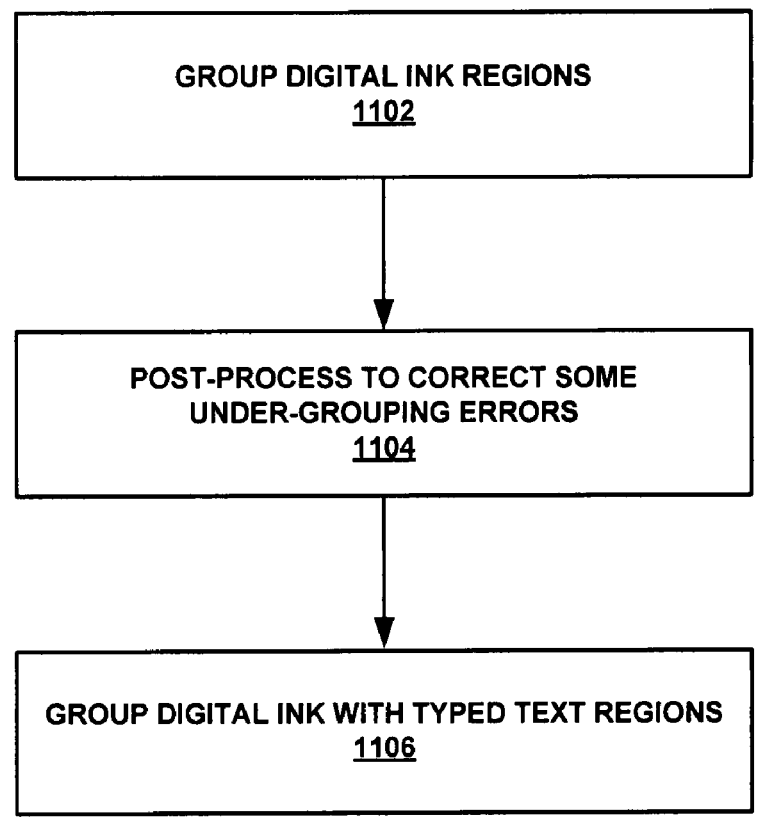
FIG. 11 is an example flow diagram of operations performed in accordance with one embodiment of the present technology.
Figure 12:
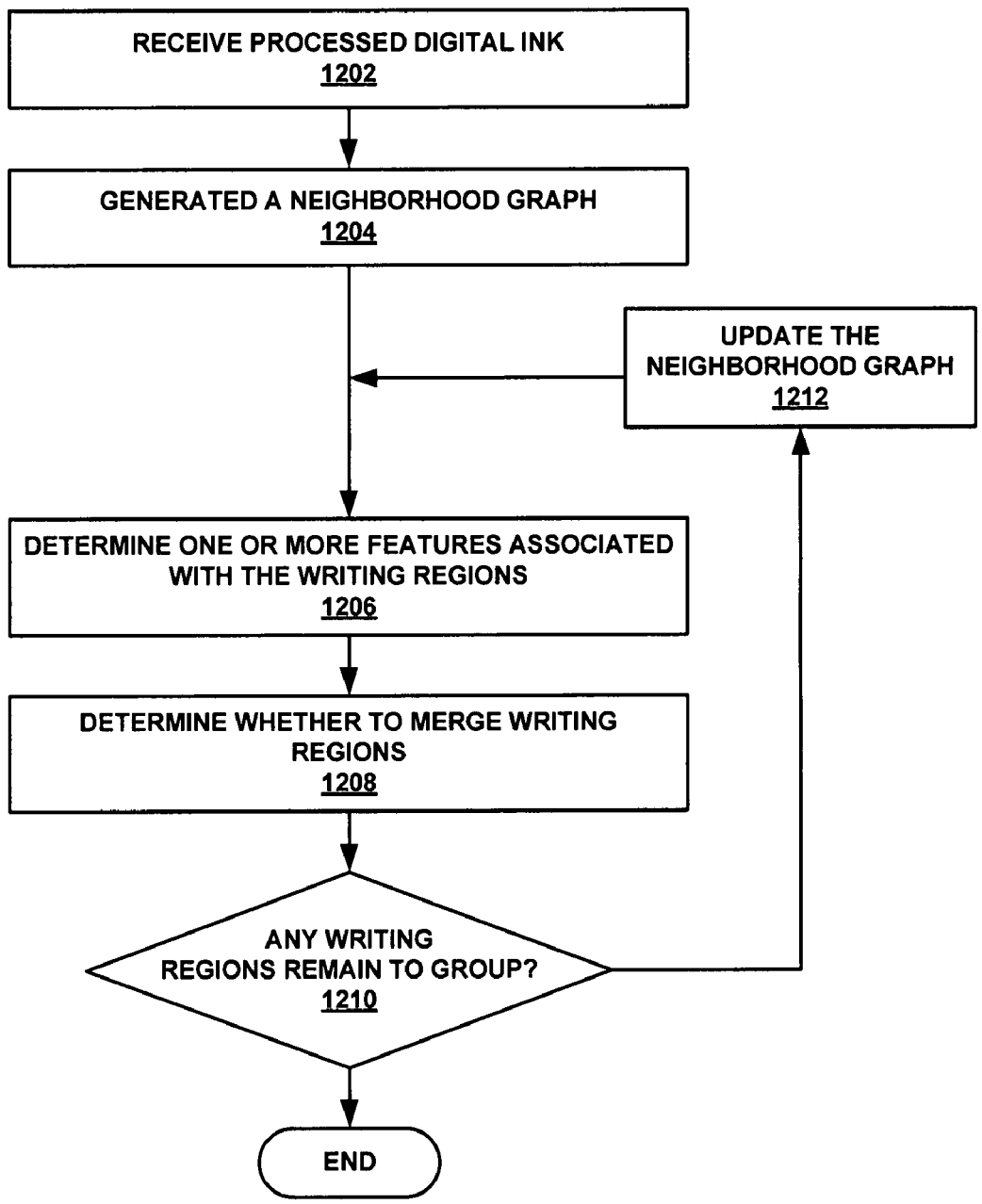
FIG. 12 is another example flow diagram of operations performed in accordance with one embodiment of the present technology.
Figure 13:
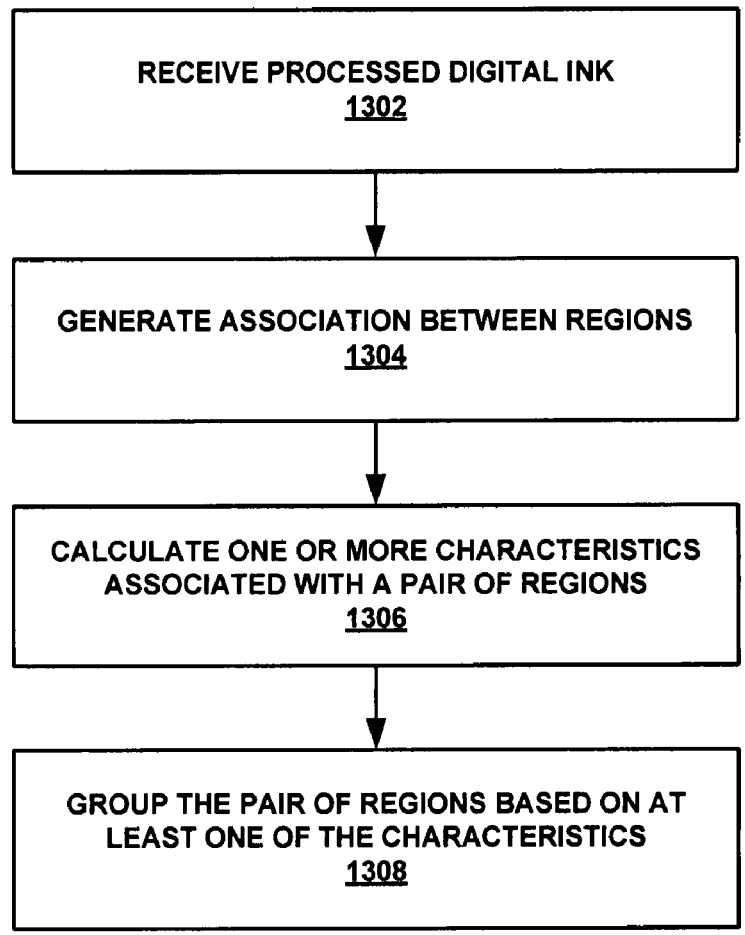
FIG. 13 is yet another example flow diagram of operations performed in accordance with one embodiment of the present technology.

The following discussion sets forth in detail the operation of some example methods of operation of embodiments of the present technology for grouping writing regions of digital ink. With reference to FIG. 11, FIG. 12 and FIG. 13, flow diagrams 1100, 1200 and 1300 each illustrate example operations used by various embodiments of the present technology for grouping writing regions of digital ink. Flow diagrams 1100, 1200 and 1300 include processes that, in various embodiments, are carried out by a processor(s) under the control of computer-readable and computer-executable instructions (or code), e.g., software. The computer-readable and computer-executable instructions (or code) may reside, for example, in data storage features such as computer usable volatile memory 108, computer usable non-volatile memory 110, peripheral computer-readable media 102, and/or data storage unit 112 of FIG. 1. The computer-readable and computer-executable instructions (or code), which may reside on computer useable media, are used to control or operate in conjunction with, for example, processor 106A and/or processors 106A, 106B, and 106C of FIG. 1. However, the computing device readable and executable instructions (or code) may reside in any type of computing device readable medium. Although specific operations are disclosed in flow diagrams 1100, 1200 and 1300, such operations are examples. Methods 1100, 1200 and 1300 may not include all of the operations illustrated by FIG. 11, FIG. 12 and FIG. 13. Also, embodiments are well suited to performing various other operations or variations of the operations recited in flow diagrams 1100, 1200 and 1300. Likewise, the sequence of the operations of flow diagrams 1100, 1200 and 1300 can each be modified. It is appreciated that not all of the operations in flow diagrams 1100, 1200 and 1300 may be performed. It is noted that the operations of methods 1100, 1200 and 1300 can be performed by software, by firmware, by electronic hardware, or by any combination thereof.

FIG. 11 is a flow diagram of an example method 1100 for grouping regions of digital ink in accordance with various embodiments of the present technology. Specifically, method 1100 can include grouping digital ink regions that can include one or more writing line structures. Post-processing can occur in order to correct some or all of the under-grouping inaccuracies that may have occurred during the grouping of the digital ink regions. Digital ink can be grouped with typed text regions.

At operation 1102, digital ink regions can be grouped. Note that the digital ink regions can include one or more writing line structures. It is noted that operation 1102 can be implemented in a wide variety of ways. For example in various embodiments, operation 1102 can be implemented in any manner similar to that described herein, but is not limited to such.

At operation 1104 of FIG. 11, post-processing can occur in order to correct some or all of the under-grouping errors that may have occurred at operation 1104. It is pointed out that operation 1104 can be implemented in a wide variety of ways. For example, in one embodiment, the grouping system 200 of FIG. 2 can tend to under-group, especially for small (e.g., short single-line) regions. For example, when tracking the history of hypotheses involving such small regions it can be observed that the hypotheses are mostly positive but the confidence scores tend to decrease as the neighboring regions agglomerate. Based on this observation, the history of the confidence scores can be utilized to correct such inaccuracies or errors.

Recall that the nearest line pair is used extensively in writing region pair feature extraction. Whenever a line pair is examined, the confidence score can be recorded of the corresponding hypothesis with the pair. This post-processing operation can be similar to the main algorithm except that each merge candidate is a large region and a neighboring small region and the confidence scores are computed differently. If the writing region pair has a vertical gap, the average can be taken of their nearest line pair's cached scores as the merge confidence. If the confidence score is not positive, some features can be relaxed (e.g., AreAdjacentInTime→true, NumLinesInBetween→0, LengthLinesInBetween→0) to favor merge and call the ranking module 214 again to recompute the confidence score. If the smaller region is embedded in the larger region, the larger region can be split into two halves at where it vertically overlaps with the smaller region, compute the average nearest line pair scores between the upper half and the small region and between the lower half and the small region, and finally take the average of these two scores as the merge confidence score. Note that operation 1104 can be implemented in any manner similar to that described herein, but is not limited to such.

At operation 1106 of FIG. 11, digital ink can be grouped with typed text regions. It is pointed out that operation 1106 can be implemented in a wide variety of ways. For example in an embodiment, merge module 218 of FIG. 2 can be implemented to perform operation 1106. In an embodiment of operation 1106, it is noted that support for mixed input—typed text and digital ink strokes—can be desirable in order to power note-taking applications such as, but not limited to, Office OneNote® by Microsoft®. For example, if the user takes a pre-typed document to a meeting and adds digital ink notes to it, the parser is expected to group the typed text and ink in a semantically meaningful way. With time signatures cached for non-ink content (e.g., shadow or text), the features described herein may not be digital ink-specific and hence the grouping system 200 can treat typed text and digital ink lines homogeneously.

Figure 9:
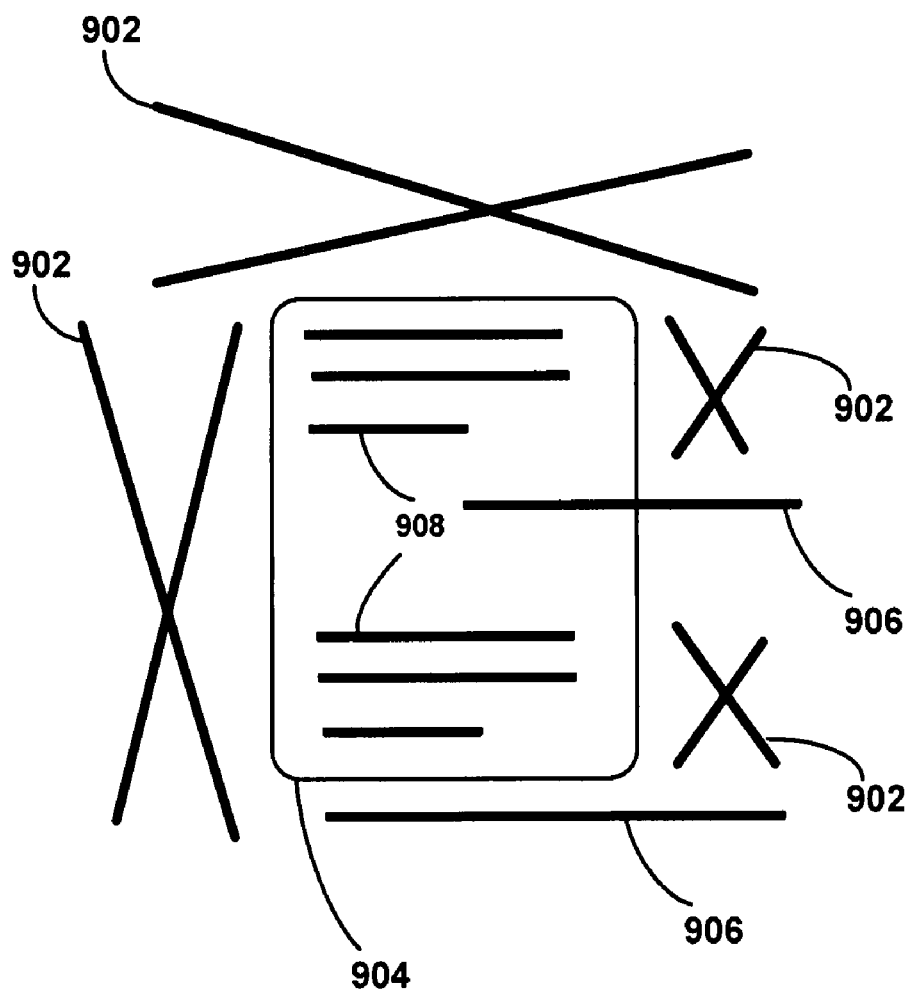
FIG. 9 illustrates an example merging of typed text and handwriting digital ink in accordance with various embodiments.

However, some applications can be more text-centric applications. As such, instead of the homogenous behavior, it involves a more text-centric support. These types of text-centric applications can request that typed text regions are not to be split or merged and the parser can merge digital ink paragraphs into a text region when the digital ink is located in allowed positions. For example, FIG. 9 illustrates an example merging of typed text and handwriting digital ink in accordance with various embodiments. Specifically, FIG. 9 includes typed text paragraphs 908, ink paragraphs 906, and a writing region 904. The crosses 902 indicate the positions where the ink paragraphs 906 will not be merged with the text outline after parsing. The ink region candidates 906 can be divided into two types based on their relative positions to text regions 908: (i) the insertion type can be hypothesized to be inserted into blanks spaces in text regions 908 and (ii) the appending type can be hypothesized to be appended to text regions 908.

Upon finishing grouping ink regions 906, candidates can be identified for insertion and appending and process them separately. For each blank space in a text region 908 that has some insertion ink region candidates 906, a hypothetical region can be created for the upper half of the text region 908 and each of the ink candidates 906, and let the pair-wise merge proceed among these hypothetical regions. Similarly to the handling of shadow segments, one or more features can be relaxed to be more aggressive in merging. The processing of appending candidates can be similar to the above except that the entire text region 908 (which could have absorbed some ink segments 906 by now) can be made into a hypothetical region.

It is pointed out that the special treatment of typed text can just involve defining initial hypothetical regions appropriately. After that the pair-wise merging technique (or algorithm) developed for digital ink content takes care of the grouping. The ease of this post-processing operation further attests to the generalization power of the framework in accordance with an embodiment of the present technology. It is noted that operation 1106 can be implemented in any manner similar to that described herein, but is not limited to such. Once operation 1106 has been completed, process 1100 can be exited.

FIG. 12 is a flow diagram of an example method 1200 for grouping writing regions of digital ink in accordance with various embodiments of the present technology. Specifically, method 1200 can include receiving processed digital ink that includes one or more writing line structures and/or drawing strokes. A neighborhood graph is generated using the writing line structures and mapping between writing regions. Utilizing the neighborhood graph, one or more features can be determined for a pair of writing regions. The one or more features can be utilized to determine whether to merge or group the pair of writing regions. Note that if the pair of writing regions is grouped, the result can become a new writing region that can be processed. A determination can be made as to whether any writing region pairs remain to be considered for grouping. If not, process 1200 can be exited. However, if any writing region pairs remain, process 1200 can proceed to the operation of updating the neighborhood graph. In this manner, writing regions of digital ink can be grouped.

At operation 1202, processed digital ink (e.g., 202) can be received that includes one or more writing line structures and/or drawing strokes. It is noted that operation 1202 can be implemented in a wide variety of ways. For example in one embodiment, the processed digital ink can be implemented in any manner similar to that described herein, but is not limited to such.

At operation 1204, a neighborhood graph can be generated utilizing the writing line structures and mapping between writing regions. It is noted that operation 1204 can be implemented in a wide variety of ways. For example, operation 1204 can be implemented in any manner similar to that described herein, but is not limited to such.

At operation 1206 of FIG. 12, utilizing the neighborhood graph, one or more features can be determined for a pair of writing regions. It is pointed out that operation 1206 can be implemented in a wide variety of ways. For example, operation 1206 can be implemented in any manner similar to that described herein, but is not limited to such.

At operation 1208, the one or more features can be utilized to determine whether to merge or group the pair of writing regions. Note that if the pair of writing regions is grouped, the result can become a new writing region that can be processed. Note that operation 1208 can be implemented in a wide variety of ways. For example, operation 1208 can be implemented in any manner similar to that described herein, but is not limited to such.

At operation 1210, a determination can be made as to whether any writing region pairs remain to be considered for grouping. If not, process 1200 can be exited. However, if any writing region pairs remain to be considered for grouping, process 1200 can proceed to operation 1212. It is pointed out that operation 1210 can be implemented in a wide variety of ways. For example, operation 1210 can be implemented in any manner similar to that described herein, but is not limited to such.

At operation 1212 of FIG. 12, the neighborhood graph can be updated. It is noted that operation 1212 can be implemented in a wide variety of ways. For example, operation 1212 can be implemented in any manner similar to that described herein, but is not limited to such. As the completion of operation 1212, process 1200 can proceed to operation 1206.

Note that operations 1202 and 1204 can be referred to as an initialization phase while operations 1206, 1208, 1210 and 1212 can be referred to as an iteration phase.

FIG. 13 is a flow diagram of an example method 1300 for grouping regions of digital ink in accordance with various embodiments of the present technology. Specifically, method 1300 can include receiving processed digital ink that includes regions (e.g., text or writing regions). One or more relationships can be generated between the different regions. One or more characteristics can be calculated that are associated with a pair of regions. The pair of regions can be grouped together based on the one or more characteristics. It is pointed out that the newly grouped pair of regions can form a new region. In this fashion, the regions of digital ink can be grouped.

At operation 1302, processed digital ink (e.g., 202) can be received that includes a plurality of regions (e.g., text or writing regions). It is noted that operation 1302 can be implemented in a wide variety of ways. For example, operation 1302 can be implemented in any manner similar to that described herein, but is not limited to such.

At operation 1304 of FIG. 13, one or more relationships (or neighboring relationships) can be generated between the different regions. Note that operation 1304 can be implemented in a wide variety of ways. For example in one embodiment, the generation of one or more relationships at operation 1304 between the different regions can include creating a neighborhood graph, but is not limited to such. Operation 1304 can be implemented in any manner similar to that described herein, but is not limited to such.

At operation 1306, one or more characteristics can be calculated that are associated with a pair of regions. Note that operation 1306 can be implemented in a wide variety of ways. For example in one embodiment, the calculation of one or more characteristics at operation 1306 can include one or more of the features described herein, but is not limited to such. Operation 1306 can be implemented in any manner similar to that described herein, but is not limited to such.

At operation 1308 of FIG. 13, the pair of regions can be grouped together based on at least one of the one or more characteristics. It is pointed out that the newly grouped pair of regions can form a new region. Note that operation 1308 can be implemented in a wide variety of ways. For example, operation 1308 can be implemented in any manner similar to that described herein, but is not limited to such. At the completion of operation 1308, process 1300 can be exited.

Example embodiments of the present technology for grouping writing regions of digital ink are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for grouping two or more writing regions of digital ink comprised in an electronic medium, the method comprising:
   receiving a first writing region and a second writing region comprising digital ink;
   determining whether there is an intent to group the first writing region and the second writing region, comprising:
   determining that there is the intent to group the first writing region and the second writing region when a drawing that is present between the first writing region and the second writing region does not overlap a first straight line segment and a second straight line segment, where the first straight line segment connects a beginning of a last line of the first writing region to a beginning of a first line of the second writing region and the second straight line segment connects an end of the last line of the first writing region to an end of the first line of the second writing region, the first straight line segment and the second straight line segment not overlapping one another; and
   determining that there is not the intent to group the first writing region and the second writing region when the drawing overlaps both the first straight line segment and the second straight line segment;
   determining a confidence score associated with the determined intent to group the first writing region and the second writing region; and
   grouping the first writing region and the second writing region when the confidence score exceeds a specified threshold.

2. The computer-implemented method of claim 1, the determining whether there is an intent performed based upon a line count associated with at least one of the first writing region or the second writing region.

3. The computer-implemented method of claim 1, the determining whether there is an intent performed based upon a distance between the first writing region and the second writing region.

4. The computer-implemented method of claim 1, the determining whether there is an intent performed based upon whether the first writing region at least partially overlaps the second writing region.

5. The computer-implemented method of claim 1, the determining whether there is an intent performed using a decision tree.

6. The computer-implemented method of claim 1, the determining whether there is an intent performed using a neural network.

7. The computer-implemented method of claim 1, the determining whether there is an intent performed using a support vector machine.

8. The computer-implemented method of claim 1, the determining whether there is an intent performed based upon a classification of digital ink comprised within at least one of the first writing region or the second writing region indicative of at least one of a writing stroke or a drawing stroke.

9. A system comprising:
one or more processors; and
memory comprising instructions that when executed by at least some of the one or more processors, perform a method for grouping two or more writing regions of digital ink comprised in an electronic medium, the method comprising:
receiving a first writing region and a second writing region comprising digital ink;
determining whether there is an intent to group the first writing region and the second writing region, comprising:
determining that there is the intent to group the first writing region and the second writing region when a drawing that is present between the first writing region and the second writing region does not overlap a first straight line segment and a second straight line segment, where the first straight line segment connects a beginning of a last line of the first writing region to a beginning of a first line of the second writing region and the second straight line segment connects an end of the last line of the first writing region to an end of the first line of the second writing region, the first straight line segment and the second straight line segment not overlapping one another; and
determining that there is not the intent to group the first writing region and the second writing region when the drawing overlaps both the first straight line segment and the second straight line segment;
determining a confidence score associated with the determined intent to group the first writing region and the second writing region; and
grouping the first writing region and the second writing region when the confidence score exceeds a specified threshold.

10. The system of claim 9, the determining whether there is an intent performed based upon a line count associated with at least one of the first writing region or the second writing region.

11. The system of claim 9, the determining whether there is an intent performed based upon a distance between the first writing region and the second writing region.

12. The system of claim 9, the determining whether there is an intent performed based upon whether the first writing region at least partially overlaps the second writing region.

13. The system of claim 9, the determining whether there is an intent performed using a decision tree.

14. The system of claim 9, the determining whether there is an intent performed using a neural network.

15. The system of claim 9, the determining whether there is an intent performed using a support vector machine.

16. The system of claim 9, the determining whether there is an intent performed based upon a classification of digital ink comprised within at least one of the first writing region or the second writing region indicative of at least one of a writing stroke or a drawing stroke.

17. A computer readable storage device comprising instructions that when executed, perform a method for grouping two or more writing regions of digital ink comprised in an electronic medium, the method comprising:
receiving a first writing region and a second writing region comprising digital ink;
determining whether there is an intent to group the first writing region and the second writing region, comprising:
determining that there is the intent to group the first writing region and the second writing region when a drawing that is present between the first writing region and the second writing region does not overlap a first straight line segment and a second straight line segment, where the first straight line segment connects the first writing region to the second writing region and the second straight line segment connects the first writing region to the second writing region, the first straight line segment and the second straight line segment not overlapping one another;
determining that there is not the intent to group the first writing region and the second writing region when the drawing overlaps both the first straight line segment and the second straight line segment;
determining that there is the intent to group the first writing region and the second writing regions based upon at least one of a line count of the first writing region or a line count of the second writing region;
determining that there is the intent to group the first writing region and the second writing region based upon a distance between the first writing region and the second writing region;
determining that there is the intent to group the first writing region and the second writing region based upon whether a structure lies between the first writing region and the second writing region;
determining that there is the intent to group the first writing region and the second writing region based upon whether the first writing region and the second writing region at least partially overlap;
determining that there is the intent to group the first writing region and the second writing region based upon a classification of digital ink comprised within at least one of the first writing region or the second writing region indicative of a writing stroke; and
determining that there is not the intent to group the first writing region and the second writing region based upon the classification of the digital ink comprised within at least one of the first writing region or the second writing region indicative of a drawing stroke;
determining a confidence score associated with the determined intent to group the first writing region and the second writing region; and
grouping the first writing region and the second writing region when the confidence score exceeds a specified threshold.

18. The computer readable storage device of claim 17, the determining whether there is an intent performed using a decision tree.

19. The computer readable storage device of claim 17, the determining whether there is an intent performed using a neural network.

20. The computer readable storage device of claim 17, the determining whether there is an intent performed using a support vector machine.

* * * * *